UNITED STATES PATENT OFFICE 2,354,464

MANUFACTURE OF CHLORSULPHONIC ACID

Napoleon Arthur Laury, Rockville Centre, N. Y., assignor to American Cyanamid Company, New York, N. Y., a corporation of Maine No Drawing. Application June 15, 1942,
Serial No. 447,149

6 Claims. (Cl. 23—139)

This invention relates to a process for the manufacture of chlorsulphonic acid, and more particularly to an improved process for the manufacture of chlorsulphonic acid from an alkali or alkaline earth metal chloride, sulphur trioxide and sulphuric acid.

In the past, chlorsulphonic acid has been produced by reacting sodium chloride with a sulphuric acid solution of sulphur trioxide. The reaction proceeds, in part, as follows:

$$2SO_3 + H_2SO_4 + NaCl = ClSO_2OH + NaHS_2O_7$$

or $$3SO_3 + H_2SO_4 + 2NaCl = 2ClSO_2OH + Na_2S_2O_7$$

However, the above designated reactions are unfortunately not the only ones taking place. When salt and oleum are admixed, the sulphuric acid acts rapidly upon the salt to form gaseous hydrogen chloride:

$$H_2SO_4 + NaCl = HCl + NaHSO_4$$

As a result, only about a 38% yield of chlorsulphonic acid, based upon the sodium chloride used, is obtained.

According to the present invention, the sulphur trioxide and an alkali or alkaline earth metal chloride, such as sodium chloride, are reacted and the resulting chlorsulphonate is treated wth fuming sulphuric acid. The steps of the process may be represented by the following equations, using sodium chloride for the purposes of illustration:

$$NaCl + SO_3 = ClSO_2ONa$$

$$2ClSO_2ONa + SO_3 + 2H_2SO_4 = 2ClSO_2OH + Na_2S_2O_7 + H_2SO_4$$

although it should be understood that applicant does not intend that his invention be limited by the theory therein set forth.

If there is no free sulphur trioxide present in the second step of the process, the sodium pyrosulphate, which is produced at this stage instead of neutral sodium sulphate, is formed at the expense of the chlorsulphonic acid yield. I have therefore found it desirable to use sulphuric acid which contains a quantity of free sulphur trioxide in order that improved yields of the chlorsulphonic acid be obtained. It is not necessary that the oleum contain a high content of free $SO_3$ nor would the use of a concentrated oleum possess any advantage in a commercial process. Excellent results may be obtained with oleum containing up to 40% free sulphur trioxide such as is readily obtainable from the converter gases of a contact sulphuric acid plant. A more concentrated oleum must be prepared by distillation and it is therefore an important advantage of the present process that comparatively dilute oleum may be utilized.

It is a further advantage of the process of the present invention that substantially no side reactions occur and consequently chlorsulphonic acid yields of 90% and over can be obtained.

The invention will be described in greater detail in conjunction with the following specific example, it being understood that the example is merely illustrative, and is not intended to limit the scope of the invention. The parts are by weight.

*Example*

100 parts of sodium chlorsulphonate containing 57.7% $SO_3$ and 40.9% NaCl (prepared by agitating dried commercial sodium chloride ground to about 200 mesh in a vessel and passing a current of sulphur trioxide over it) and 125 parts of oleum containing 30% free $SO_3$ are fed continuously into an oil-heated cast iron retort which is connected by means of a gas flue in its cover to a condenser. The charge is distilled at a temperature between about 146° and 153° C. and 77 parts of crude distillate are obtained. This corresponds to a 91.5% yield of chlorsulphonic acid, based on the sodium chloride used. If the product contains dissolved sulphur trioxide, it may be removed by distillation with a small quantity of sodium chloride.

During the reaction the pyrosulphate by-product accumulates in the retort and it is maintained at an approximately constant level by pumping some out once during each shift. A depth of 4 or 5 feet in the retort serves as a good working medium and heat reservoir. The temperature of the pool of acid sulphate in the retort must be high enough to keep it fluid and easily pumped, but it is best not to let it exceed 250° C.

It should be understood that the invention is not limited to the use of sodium chloride and any other alkali or alkaline earth metal chloride such as potassium chloride, calcium chloride, and the like, may be substituted therefor. Moreover, the process may also be carried out as a batch process.

The sulphur trioxide used in the preparation of sodium chlorsulphonate need not be very concentrated or of particularly high purity. The gas mixture issuing from the converter of a contact sulphuric acid plant may advantageously be utilized.

This application is a continuation-in-part of my copending application, Serial No. 382,457, filed March 8, 1941.

What I claim is:

1. A process for manufacturing chlorsulphonic acid which comprises heating a member of the group consisting of alkali and alkaline earth metal chlorsulfonates with fuming sulphuric acid containing up to about 40% free sulphur trioxide to produce and distill off chlorsulphonic acid.

2. A process for manufacturing chlorsulphonic acid which comprises first reacting gaseous sulphur trioxide with a member of the group consisting of alkali and alkaline earth metal chlorides to form the corresponding chlorsulphonate and then heating the chlorsulphonate with fuming sulphuric acid containing up to about 40% free sulphur trioxide to produce and distill off chlorsulphonic acid.

3. A process for manufacturing chlorsulphonic acid which comprises first reacting gaseous sulphur trioxide with an alkali metal chloride to form the corresponding chlorsulphonate and then heating the chlorsulphonate with fuming sulphuric acid containing up to about 40% free sulphur trioxide to produce and distill off chlorsulphonic acid.

4. A process for manufacturing chlorsulphonic acid which comprises first reacting sodium chloride with the sulphur trioxide containing gas mixture which issues from the converter of a contact sulphuric acid plant to form sodium chlorsulphonate, and then heating the sodium chlorsulphonate with fuming sulphuric acid containing up to about 40% free sulphur trioxide to produce and distill off chlorsulphonic acid.

5. A process for manufacturing chlorsulphonic acid which comprises first reacting gaseous sulphur trioxide with sodium chloride to form sodium chlorsulphonate, and then heating the sodium chlorsulphonate with an excess of fuming sulphuric acid containing up to about 40% free sulphur trioxide at a temperature of about 146° C. to about 153° C. to produce and distill off chlorsulphonic acid.

6. A process for manufacturing chlorsulphonic acid which comprises first reacting gaseous sulphur trioxide with sodium chloride to form sodium chlorsulphonate, then heating the sodium chlorsulphonate with fuming sulphuric acid containing up to about 40% free sulphur trioxide to produce chlorsulphonic acid, and continuously distilling the chlorsulphonic acid from a pool of molten sodium pyrosulphate.

NAPOLEON ARTHUR LAURY.